June 16, 1959  R. L. SMITH ET AL  2,890,528
CATHODE RAY TUBE DISPLAY FOR GROUNDED AIRCRAFT TRAINER
Filed April 6, 1954  2 Sheets-Sheet 1
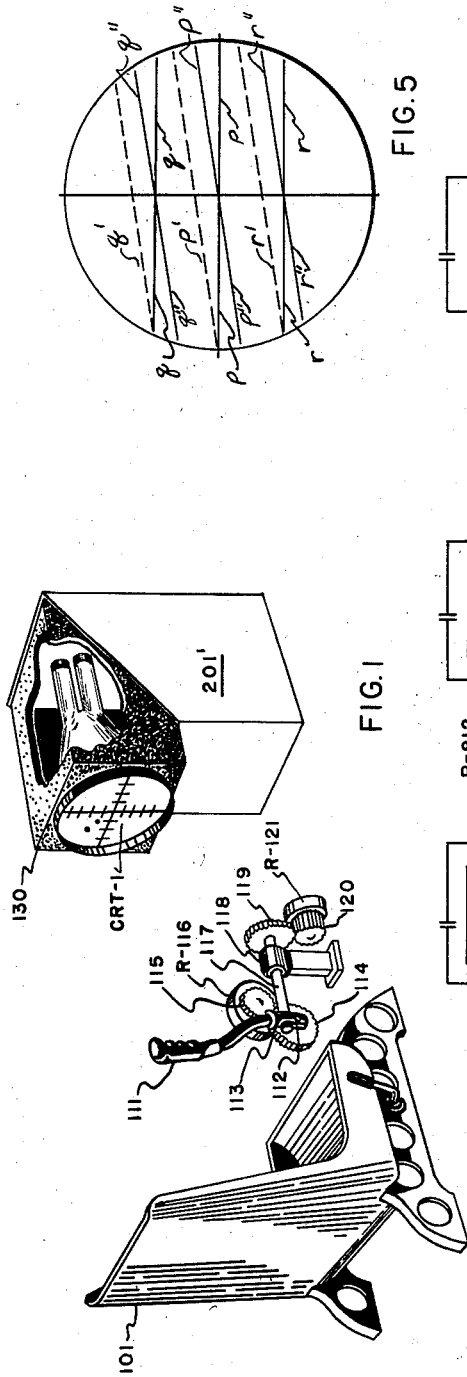
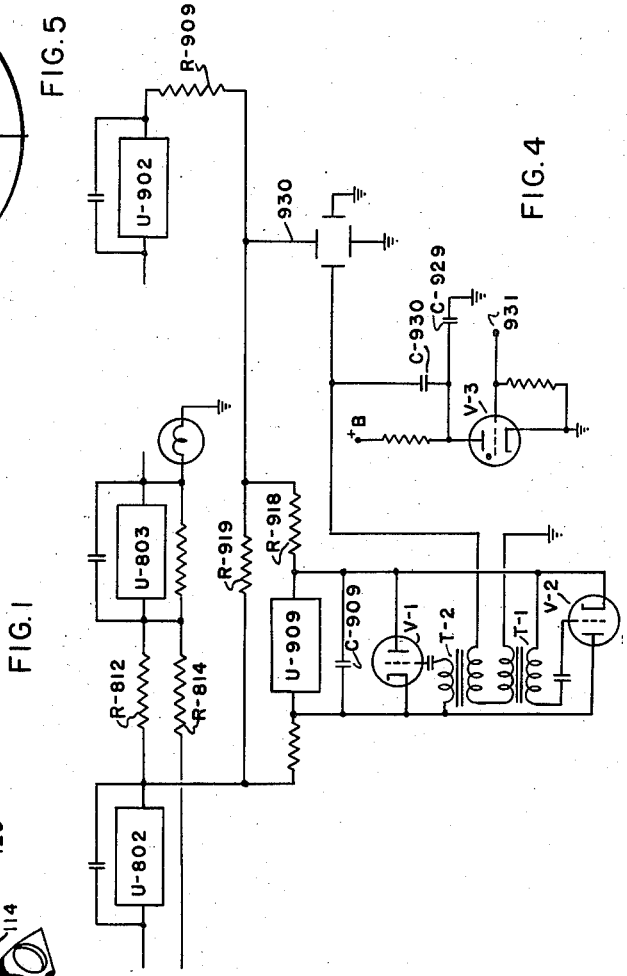

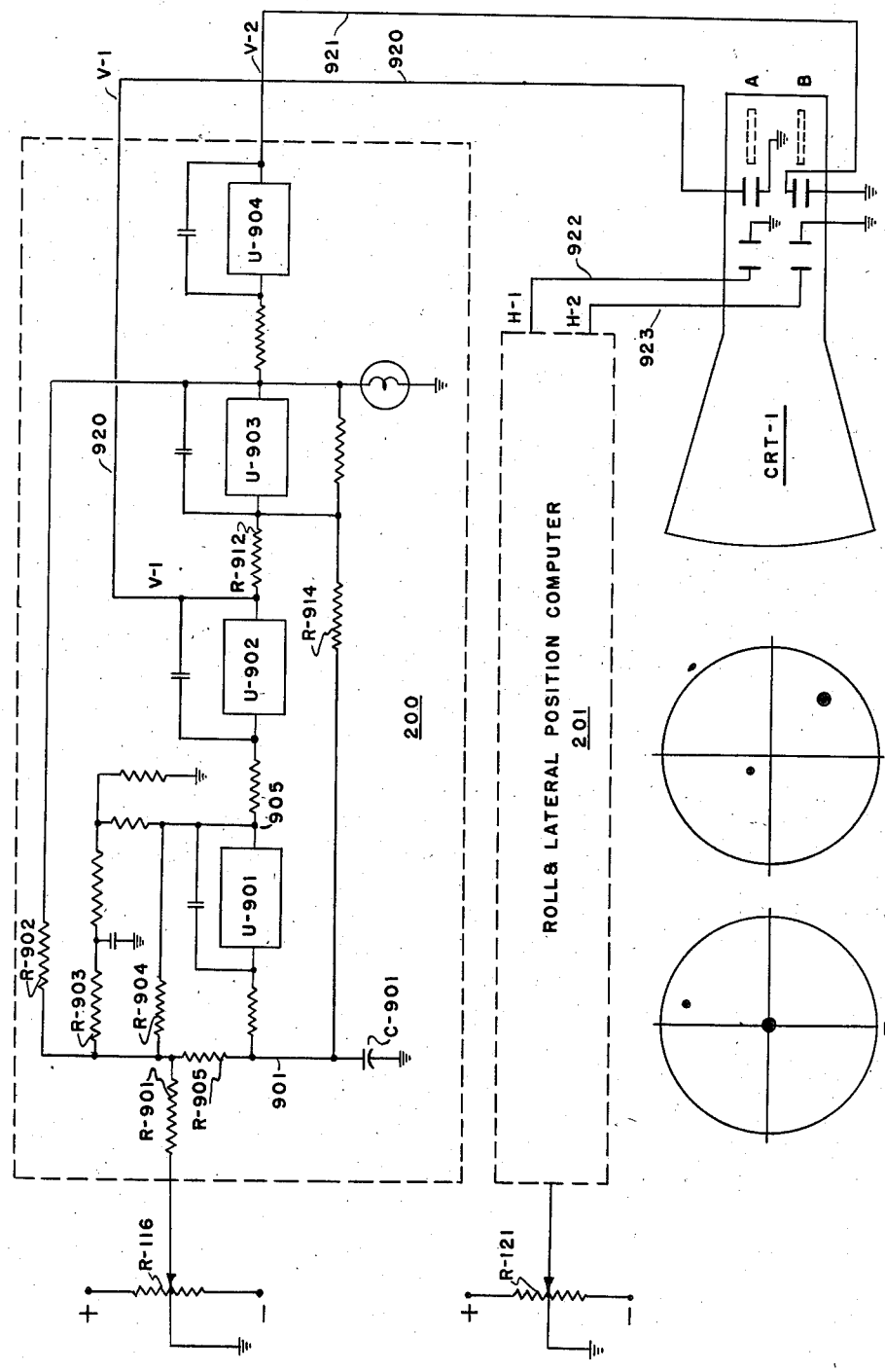

United States Patent Office 2,890,528
Patented June 16, 1959

2,890,528

CATHODE RAY TUBE DISPLAY FOR GROUNDED AIRCRAFT TRAINER

Robert L. Smith and Harold S. Hemstreet, Binghamton, N.Y., assignors to Link Aviation, Inc., Binghamton, N.Y., a corporation of New York Application April 6, 1954, Serial No. 421,255

3 Claims. (Cl. 35—12)

This invention relates to a ground aviation training device, and more specifically, to an indicating device for use in training pilots in the operation of aircraft controls such as a helicopter cyclic pitch control. The cyclic pitch control stick in a typical modern helicopter corresponds roughly to the control stick in a conventional fixed-wing aircraft in that both control aircraft attitude, but differs materially in that it exercises much greater control over aircraft direction. In training pilots of fixed wing aircraft to fly helicopters, great expense and time are required to teach proper manipulation of the cyclic pitch control so as to accomplish hovering and slow movements above a fixed ground point.

It is therefore a primary object of the invention to provide improved and inexpensive means for indicating a simulated attitude and location in a grounded training device.

It is another object of the invention to provide simple yet realistic means for teaching operation of a helicopter cyclic pitch control.

Other objects of the invention will in part be obvious and will in part appear hereinafter. The invention accordingly comprises the features of construction, combinations of elements, and arangements of parts, which will be exemplified in the constructions hereinafter set forth, and the scope of the invention will be indicated in the claims.

For a fuller understanding of the principles and features of the invention, reference may be had to the accompanying drawings, in which:

Fig. 1 illustrates schematically a preferred embodiment of the physical layout of the apparatus of the invention;

Fig. 2 is an electrical schematic diagram of the computer portions of the invention;

Fig. 3 shows several views of typical indications on the display device of one embodiment of the invention;

Fig. 4 is an electrical schematic of an alternative embodiment of the invention, and Fig. 5 illustrates typical indications occurring upon the display device of the alternative embodiment.

Referring to Fig. 1 there is shown a chair 101 similar to the pilot's seat of a typical helicopter. Situated in front of chair 101 is cyclic pitch control stick 111, which may be manipulated by the student in the same manner as the cyclic helicopter. Fore and aft movement of control stick 111 (right and left as viewed in Fig. 1) pivots control stick 111 about shaft 112, which is attached to stick 111 by means of clevis 113. Rigidly attached to clevis 113 and rotatable therewith about shaft 112 is spur gear 114, which meshes with spur gear 115. Rotation of spur gear 115 rotates the shaft of potentiometer R-116, and hence the position of the wiper arm of potentiometer R-116 is a measure of the fore-and-aft cyclic pitch stick displacement. The case of potentiometer R-116 is fixedly mounted by means not shown.

Shaft 112 is journalled in a perpendicularly-disposed shaft 117, which is supported in a bearing pedestal 118 as shown in Fig. 1. Sidewise pivotal movement of stick 111 rotates shaft 117 in bearing 118. Rigidly attached to the other end of shaft 118 is spur gear 119, which meshes with spur gear 120, rotating the shaft of potentiometer R-121, which is also fixedly-mounted by means not shown. It will be apparent that the wiper arm position of potentiometer R-121 is therefore a measure of sidewise cyclic pitch stick displacement. Electrical connections are made from the potentiometers by means of cables (not shown) to the computer apparatus portion of the invention, which may be housed within housing 201. For optimum training effect, it is deemed preferable in practice of the invention to provide a full-size simulated control stick placed the correct distance from the student's seat, but it will be apparent that a miniaturized control stick may be used. It will be further apparent that while we have shown schematically a specific mechanical arrangement for resolving control stick displacement into two perpendicular components, that numerous equivalent arangements will be readily apparent to those skilled in the art. Situated in front of seat 101 and observable by the student as he manipulates control stick 111 is instrument panel 130, upon which is mounted cathode ray tube CRT-1. By observing the indications on the face of CRT-1 as he manipulates control stick 111, the student is enabled to learn the effects of control stick displacement upon aircraft attitude and location.

The present invention also comprises computer apparatus within housing 201' for receiving input signals commensurate with displacement of control stick 111 in order to compute simulated aircraft attitude and location to provide proper indications on CRT-1. Shown generally at 200 in Fig. 2 is an electrical schematic diagram of the pitch and fore-and-aft travel computer portion of the invention, in which certain portions are shown in block diagram form for sake of clarity. A similar computer indicated generally at 201 is provided for determining simulated roll and lateral travel. The computers may be identical except for circuit constants commensurate with the roll and pitch moments of inertia of the aircraft, and the same computers may be utilized as are shown in the co-pending application Serial Number 419,954 of Harold S. Hemstreet entitled "Grounded Aviation Trainer," filed March 31, 1954, and assigned to the same assignee as the present invention. Since the specific details of the two computers do not form part of the present invention, only a brief description of the operation of the apparatus will be set forth herein, and for a detailed description of the circuit operation of the computers, reference may be made to the aforementioned Hemstreet application.

Fore-and-aft components of the displacement of control stick 111 position the wiper arm of potentiometer R-116 as described above, applying a positive or negative voltage commensurate with displacement from a centered position through resistor R-901 to conductor 901. Various currents from resistors R-902, R-903, and R-904 are summed with the current from R-901 in summing resistor R-905 to provide a charge across capacitor C-901 substantially commensurate with the angle of the rotor blade plane of rotation. Movement of the cyclic pitch control of a conventional helicopter tilts a "swash plate," which increases the pitch of the rotor blades during a portion of their cycle of rotation and decreases their pitch during another portion of their rotation. For example, if the control stick is pushed forward, the swash plate causes the helicopter lifting rotor blades to have decreased pitch as they pass through the forward portion of rotation and to have increased pitch as they pass through the rearward portion of rotation. This variation in pitch causes greater lift on the blades as they pass through the rearward portion of rotation, causing the plane of rotation through which the blades sweep to be tilted forwardly. The tilting of the plane of rotation is resisted by the gyroscopic action of the blades and of the stabilizer bar, a long thin rod having bob weights on its ends and mounted to rotate in a plane parallel to the rotor blade plane. Potentials commensurate with the various forces tending to change the rotor blade plane of rotation are derived and applied through a time lag circuit. The time lag circuit consists of resistance R–905 and capacitor C–901.

It will be seen that tilting of the plane of rotation of the lifting rotor blades of a helicopter from the horizontal will cause a component of lifting force to be exerted in a horizontal direction upon the rotor mast, causing the aircraft to be pitched about it center of gravity. Since the pitching moment caused by tilting of the rotor blade plane of rotation is nearly proportional to the tilt of the rotor blade plane from its equilibrium position normal to the mast, the integration with respect to time of the rotor blade plane angle potential will provide a potential proportional to aircraft pitching rate. A voltage commensurate with that quantity is applied through resistor R–906 to a conventional Miller integrator U–901, to provide a potential at terminal 905 commensurate with aircraft pitching rate, as is explained in detail in the aforementioned Hemstreet application. Miller integrators are discussed in detail in volume 21 (pp. 79–83) and volume 20 (pp. 114–118) of the Massachusetts Institute of Technology "Radiation Laboratory Series" (McGraw-Hill, New York, 1948, 1949). Each integrator is shown as a block, with its feedback capacitor shown connected from output to input. The voltage at terminal 905 is applied through a resistor to integrator U–902, which provides an output potential $V_1$ having a magnitude commensurate with the amount of aircraft pitch angle and a polarity dependent upon pitch direction. Potential $V_1$ is applied through conductor 920 to the vertical deflection plate of one beam A of a dual-beam cathode ray tube CRT–1. The potentials proportional to rotor blade rotation angle and potential $V_1$ are also applied through resistors R–914 and R912, respectively, to the input of integrator U–903, which produces an output potential commensurate with ground speed along the longitudinal axis of the aircraft and an imaginary practice area. As well as pitching the aircraft about its center of gravity, the force component due to rotor plane tilting translates the aircraft through the air. Since the magnitude of the force component is nearly proportional to the tilt of the rotor blade plane from its equilibrium position normal to the mast, the potential across capacitor C–901 is also a measure of the translatory force acting normal to the helicopter mast due to tilting of the rotor blade plane. The component of the rotor lifting force which acts in a horizontal direction is simulated by applying a voltage proportional to pitch angle via resistor R–912 to integrator U–903. While the components of the forces mentioned are more nearly related to the sines of the rotor blade plane tilt angle and the aircraft pitch angle, the fact that both angles are maintained small throughout normal flight allows use of "angle" potentials without serious error. The output of integrator U–903 is again integrated by integrator U–904 to produce an output potential $V_2$ commensurate with simulated aircraft travel or distance along the longitudinal axis of the aircraft with respect to an arbitrary ground point. Potential $V_2$ is applied through conductor 921 to a vertical deflection plate of beam B of dual beam cathode ray tube CRT–1.

Sidewise deflection of control stick 111 positions the wiper arm of potentiometer R–121 as explained above, applying a potential to computer 201. The roll and lateral position computer 201 functions in a manner identical in principle to that of computer 200, providing an output potential $H_1$ commensurate with simulated aircraft bank angle and a potential $H_2$ commensurate with simulated aircraft lateral travel. Potential $H_1$, commensurate with bank angle, is applied through conductor 922 to a horizontal deflection plate of beam A of CRT–1. Potential $H_2$, commensurate with distance of simulated travel in a lateral direction from the center of the imaginary practice area, is applied through conductor 923 to a horizontal deflection plate of beam B of CRT–1. One of the beams of CRT–1 should be de-focused, so that one beam will cast a larger dot on the face of the scope, and the identity of the dots may then more easily be recognized.

The dot or trace on the screen of CRT–1 from beam A may be seen to be positioned horizontally by aircraft bank angle and vertically by aircraft pitch angle. If the aircraft is nose-level and unbanked, the dot or trace from beam A will appear at the center of the screen of CRT–1. If the simulated aircraft pitches forward, (nose down), the voltage $V_1$ will change, deflecting beam A downwards. If the simulated aircraft rolls to the right, beam A will be deflected to the right (as viewed by the student) due to the change in potential $H_1$.

The dot or trace on the screen of CRT–1 from beam B may be seen to be positioned horizontally by lateral travel of the aircraft and vertically by longitudinal travel of the aircraft with respect to an imaginary point on the surface of the earth. As the aircraft travels forward, beam B is deflected upward. As the aircraft travels to the right, beam B is deflected to the right (as viewed by the student). When the simulated aircraft is in the center of the practice area both longitudinally and laterally, the dot from beam B will appear at the center of the screen of CRT–1.

Assume that the location or travel beam B is de-focused so that beam B causes a larger dot on the screen of CRT–1. Fig. 3a shows a view of the screen of CRT–1 under simulated flight conditions in which the aircraft is pitched far forward and banked slightly to the pilot's right, and the aircraft is located at the exact center of the imaginary practice area. Fig. 3b shows a view of the screen of CRT–1 under simulated flight conditions in which the aircraft has traveled backward and to the pilot's right, but in which the simulated aircraft is banked to the left and pitched forward. Since direction of helicopter travel depends upon aircraft attitude, it will be seen that the location or travel dot will tend to travel in a direction corresponding to the deviation of the attitude dot from the center of the screen. By observing the movement of the location dot and the attitude dot as he manipulates control stick 111, a student is thusly enabled to learn proper manipulation of the cyclic pitch control of a typical helicopter. The abovementioned Hemstreet application explains in detail the aerodynamic and mathematical operation of the attitude and position computers. It will be apparent that resistors and other components in the computers may be made variable in order to simulate realistically the operation of different types of aircraft. It will be further apparent that various features of the Hemstreet application may be added to the device of the present invention to provide more complete simulation.

Shown in Fig. 4 is an alternative embodiment of a portion of the invention, in which like parts correspond to like portions of Fig. 2. Integrator U–802 computes bank angle in a manner similar to the computation of pitch angle by integrator U–902 of Fig. 2 and produces an output potential commensurate with roll or bank angle of the simulated aircraft. As well as being applied to integrator U–803 to compute lateral velocity, the bank angle voltage is applied to integrator U–909, which periodically integrates bank angle with respect to time. Assuming that bank angle remained constant, the capacitor C–909 of integrator U–909 might charge up linearly as time passes. However, the two triodes V–1 and V–2 connected across capacitor C–909 are caused to conduct at periodic intervals to short and discharge capacitor C–909. This will serve to present a sloped trace upon the screen of CRT–1, as will be further explained.

Assume that a sawtooth wave from a conventional cathode ray tube sawtooth generator V–3 is applied to a horizontal deflection plate of beam A of CRT–1 through capacitor C–930. This would cause a horizontal trace across the face of the screen similar to line $p$ of Fig. 5. As aircraft pitch angle varied, the potential output of integrator U–902 would vary. This potential is applied through resistor R–909 to a vertical deflection plate of beam A of CRT–1, thereby causing trace $p$ to be raised or lowered on the screen, as shown at $q$ and $r$ in Fig. 5. If now, a voltage were applied to the vertical deflection plate which was positive or negative depending upon simulated angle of bank which increased linearly with time, and which was synchronized with the horizontal sweep of the cathode ray tube, the trace on the scope would appear as at $p'$, $q'$ or $r'$ (shown as dashed lines in Fig. 5) depending upon the pitch voltage applied through resistor R–909. Such a voltage is applied to the vertical deflection plate through resistor R–918 from integrator U–909. A pulse delivered to the grids of triodes V–1 and V–2 at the end of each horizontal sweep via transformers T–1 and T–2 causes one of the triodes to conduct, shorting and discharging integrating capacitor C–909 during the retrace time of the horizontal sweep. Which triode will conduct, depends, of course, upon the polarity of the charge across capacitor C–909. The pulses to transformers T–1 and T–2 are also supplied from the cathode ray tube sawtooth generator V–3 through capacitor C–930.

In order to make the trace on the screen pivot with changes in bank angle about the center of the screen rather than the start of the sweep, an additional voltage is applied to the vertical deflection plate through resistor R–919. Since the voltage from resistor R–919 is of opposite polarity from the output voltage of integrator U–909, and since it is of constant amplitude during each sweep cycle (assuming no change in bank angle), it will serve to lower or raise the trace upon the screen an amount dependent upon the resistance of R–919. By suitable selection of resistor R–919, the trace may be raised or lowered in accordance with bank angle to make the actual trace on the screen appear as at $p''$, $q''$ or $r''$ (for various examples of pitch angle).

Hence it may be seen that the trace appearing on the screen of the cathode ray tube will change slope in accordance with simulated aircraft banking, and that the trace will raise or lower in accordance with simulated aircraft pitching. The trace will then constitute a realistic simulation of the horizon line of many conventional aircraft attitude instruments. The horizontal sweep amplitude may be adjusted to extend completely across the face of the cathode ray tube in simulation of a horizon line, or it may be decreased in amplitude to extend only a short distance across the screen in simulation of the miniature aircraft appearing on many aircraft attitude instruments. If shortened to simulate the miniature aircraft rather than the horizon line, the direction of vertical deflection should be reversed (as by reversal of connections to the vertical deflection plates).

It will be apparent that balanced cathode ray deflection may be easily substituted by those skilled in the art for the unbalanced systems shown with only minor modification. It will also be apparent that alternating current computation may be substituted for the direct current systems shown by use of standard computer procedures.

It will thus be seen that the objects set forth above, among those made apparent from the preceding description are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Apparatus for indicating the simulated attitude and position of a grounded training device comprising a control operable by a student to cause simulated changes in attitude and position, means responsive to said one or more controls for deriving potentials commensurate with simulated rotation and translation of said training device, a cathode ray tube having a screen, plural beams directed toward said screen and deflection means individual to each of said beams, and circuit means for applying said potentials individually to said deflection means, whereby the location of said beams on said screen will indicate simulated attitude and position of said training device.

2. Grounded aircraft training apparatus comprising a student's station, an aircraft control operable by a student to cause simulated rotational and translational motion, means for deriving a first potential commensurate with simulated angle of bank, means for deriving a second potential commensurate with simulated angle of pitch, means for deriving a third potential commensurate with simulated longitudinal distance from a reference point, means for deriving a fourth potential commensurate with lateral distance from said reference point, a dual-beam cathode ray tube having a screen upon which dual electron beams may be observed and a pair of deflection means perpendicularly disposed to each other individual to each beam, circuit means for applying said first and second potentials to the deflection means individual to one beam, and circuit means for applying said third and fourth potentials to the deflection means individual to the second beam, whereby the locations of said beams on said screen will indicate the simulated attitude and location with respect to a reference point.

3. Grounded aviation training apparatus for simulating a rotary-wing aircraft comprising a student's station, a simulated cyclic pitch control stick operable by a student, plural means responsive to perpendicular components of stick motion for deriving potentials commensurate with cyclic pitch displacement, computer means individual to each of said foregoing means for deriving first and second potentials respectively commensurate with simulated aircraft attitude and simulated aircraft location with respect to a reference point, a cathode ray tube having an observable screen and dual beams, and circuit means for applying said first and second potentials to individual beams.

References Cited in the file of this patent

UNITED STATES PATENTS

| Number | Name | Date |
|---|---|---|
| 2,298,476 | Goldsmith | Oct. 13, 1942 |
| 2,350,351 | Grunberg | June 6, 1944 |
| 2,361,390 | Ferrill | Oct. 31, 1944 |
| 2,471,315 | Dehmel | May 24, 1949 |
| 2,472,888 | Cunningham | June 14, 1949 |
| 2,510,529 | Takats | June 6, 1950 |
| 2,516,069 | Newhouse et al. | July 18, 1950 |
| 2,522,380 | Kline et al. | Sept. 12, 1950 |
| 2,555,442 | Hales | June 5, 1951 |
| 2,597,784 | Field et al. | May 20, 1952 |
| 2,695,143 | Andrix | Nov. 23, 1954 |
| 2,711,594 | Hickey | June 28, 1955 |